US008782514B1

(12) United States Patent
Chiu

(10) Patent No.: US 8,782,514 B1
(45) Date of Patent: Jul. 15, 2014

(54) PARALLEL XML PARSING USING META-DFAS

(75) Inventor: Kenneth Chiu, Vestal, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 1037 days.

(21) Appl. No.: 12/636,342

(22) Filed: Dec. 11, 2009

Related U.S. Application Data

(60) Provisional application No. 61/122,132, filed on Dec. 12, 2008.

(51) Int. Cl.
*G06F 17/00* (2006.01)
*G06F 17/22* (2006.01)
*G06F 17/27* (2006.01)

(52) U.S. Cl.
CPC ........ *G06F 17/2247* (2013.01); *G06F 17/2705* (2013.01)
USPC ........... 715/234; 707/790; 707/791; 707/797; 709/243

(58) Field of Classification Search
CPC .......................... G06F 17/2247; G06F 17/2705
USPC .............................. 715/234; 707/790, 791, 797
See application file for complete search history.

(56) References Cited

U.S. PATENT DOCUMENTS

| 5,987,468 | A | * | 11/1999 | Singh et al. ............................ 1/1 |
| 7,210,097 | B1 | * | 4/2007 | Clarke et al. ................... 715/227 |
| 7,627,570 | B2 | * | 12/2009 | Bosloy et al. .......................... 1/1 |
| 7,962,524 | B2 | * | 6/2011 | Okamoto et al. ............. 707/797 |
| 2002/0091991 | A1 | * | 7/2002 | Castro ............................ 717/106 |
| 2002/0111932 | A1 | * | 8/2002 | Roberge et al. .................... 707/1 |
| 2003/0084078 | A1 | * | 5/2003 | Torii et al. ...................... 707/513 |
| 2004/0267803 | A1 | * | 12/2004 | Zhou et al. ..................... 707/102 |
| 2005/0049996 | A1 | * | 3/2005 | Srinivasan et al. ................ 707/1 |
| 2005/0108428 | A1 | * | 5/2005 | Cornet et al. .................. 709/243 |
| 2005/0203957 | A1 | * | 9/2005 | Wang et al. ................. 707/104.1 |
| 2005/0268341 | A1 | * | 12/2005 | Ross ................................ 726/26 |
| 2006/0136570 | A1 | * | 6/2006 | Pandya .......................... 709/217 |

(Continued)

OTHER PUBLICATIONS

Parallel XML Parsing Using Meta-DFAs by Yinfei Pan, Ying Zhang, Kenneth Chiu and Wei Lu presented at theThird IEEE International Conference on e-Science and Grid Computing (Dec. 10-13, 2007).*

(Continued)

*Primary Examiner* — William Bashore
*Assistant Examiner* — Nathan Shrewsbury
(74) *Attorney, Agent, or Firm* — Steven M. Hoffberg; Ostrolenk Faber LLP

(57) ABSTRACT

XML parsing (PXP) can be improved using multicore CPUs, enhancing its suitability for scientific data. One approach is to divide the XML document into equal-sized chunks, and parse each chunk in parallel. XML parsing is inherently potentially dependent on all preceding characters. The skeleton, an outline of the document generated during a fast preparse, is used to guide full parallel parsing. The preparse is a sequential phase that limits scalability, and this phase can also be parallelized using a meta-DFA mechanism. For each state q of the original preparser the meta-DFA incorporates a complete copy of the preparser state machine as a sub-DFA which starts in state q running multiple instances of the preparser simultaneously when parsing a chunk, with each possible preparser state at the beginning of a chunk represented by an instance. By pursuing all possibilities simultaneously, the meta-DFA allows each chunk to be preparsed independently in parallel.

16 Claims, 9 Drawing Sheets

(56) References Cited

U.S. PATENT DOCUMENTS

| | | | |
|---|---|---|---|
| 2007/0113172 A1* | 5/2007 | Behrens et al. | 715/513 |
| 2007/0150809 A1* | 6/2007 | Yoshida | 715/525 |
| 2007/0219959 A1* | 9/2007 | Kanemasa | 707/3 |
| 2007/0226362 A1* | 9/2007 | Johnson et al. | 709/230 |
| 2007/0294282 A1* | 12/2007 | Cruver | 707/102 |
| 2007/0299811 A1* | 12/2007 | Chandrasekar et al. | 707/2 |
| 2008/0046423 A1* | 2/2008 | Khan Alicherry et al. | 707/6 |
| 2008/0082484 A1* | 4/2008 | Averbuch et al. | 707/3 |
| 2008/0270342 A1* | 10/2008 | Ruehle | 707/1 |
| 2008/0270573 A1* | 10/2008 | Letz et al. | 709/218 |
| 2009/0006944 A1* | 1/2009 | Dang et al. | 715/234 |
| 2009/0037379 A1* | 2/2009 | Bou-Diab et al. | 707/3 |
| 2009/0052329 A1* | 2/2009 | Mahajan et al. | 370/242 |
| 2009/0094606 A1* | 4/2009 | Chen et al. | 718/100 |
| 2009/0327861 A1* | 12/2009 | Coulson et al. | 715/234 |
| 2010/0057669 A1* | 3/2010 | Gandini et al. | 707/1 |
| 2010/0281160 A1* | 11/2010 | Ros-Giralt et al. | 709/224 |
| 2011/0016153 A1* | 1/2011 | Atta et al. | 707/797 |

OTHER PUBLICATIONS

Parallel XML Parsing Using Meta-DFAs by Yinfei Pan, Ying Zhang, Kenneth Chiu (Grid 2006).*
Constructing Finite State Automata for High-Performance XML Web Services by Robert A. van Engelen (Published in the proceedings of the International Symposium on Web Services and Applications (ISWS) 2004).*

* cited by examiner

| Context Number | Status | Equivalence Class | Skeleton | Stack |
|---|---|---|---|---|
| context 0 | live | 0 | skeleton 0 | stack 0 |
| context 1 | dead | 1 | N/A | N/A |
| context 2 | live | 2 | skeleton 2 | stack 2 |
| context 3 | duplicate (static) | 0 | pointer to skeleton 0 | pointer to stack 0 |
| ⋮ | ⋮ | ⋮ | ⋮ | ⋮ |
| context N | duplicate (dynamic) | M | skeleton M | stack M |

```
<MoleculeType ...>
    <moleculeName ...>1kzk</moleculeName>
    <moleculeRadius .../>
    <atom ...>
        <atomNumber ...>...</atomNumber>
        <atomName ...>...</atomName>
        <atomicNumber .../>
        <elementName .../>
        <residueName ...>...</residueName>
        <coordinates ...>
            <x .../><y .../><z .../>
        </coordinates>
        <radius ...>...</radius>
    </atom>
    <atom ...>
        ...
    </atom>
    ...
</MoleculeType>
```

Fig. 9

PARALLEL XML PARSING USING META-DFAS

BACKGROUND OF THE INVENTION

1. Introduction

By serving as a common language for loosely-coupled, message-oriented interactions, XML has greatly facilitated the development of large-scale, interoperable applications. At the same time, however, the very characteristics that lend themselves well to this purpose, such as XML's self-descriptive nature, have resulted in concerns about performance [3]. These concerns have led to work such as alternative encodings of XML to reduce serialization and deserialization costs [2], differential techniques [7, 12] to cache results from similar messages for reuse, schema-specific techniques to optimize parsing for specific schemas [4, 14], and hardware acceleration to speedup XML parsing [5].

On the hardware front, recently manufacturers have increasingly opted to use chip real estate to provide multiple cores per CPU rather than faster CPUs. Parallel techniques will thus become increasingly important to exploit the march of Moore's Law [11], suggesting parallelism as another avenue for improving the performance of XML parsing.

Parallelism can be introduced into an application at different levels of granularity. For example, under a naturally concurrent workload consisting of a stream of independent, incoming service requests, throughput can be improved by assigning a separate core to each incoming request. For some applications, however, the computation of a single job itself may be parallelized across all cores of a machine. Since typically the computation cannot proceed until the entire input has been read, most cores will be idle during input I/O if the input parsing is single-threaded. In this case, assigning multiple cores to parse the input in parallel may be beneficial, especially if the input contains a sizable amount of data. Thus, applying parallelism to processing such XML parsing could bring significant benefit.

An XML document could be parsed in parallel by dividing the XML document into equal-sized chunks, and parsing each chunk in parallel, with one core per chunk. The term chunk is used here to refer to any contiguous sequence of characters. XML parsing is inherently sequential, however, because the state of an XML parser when reading a given character depends potentially on all preceding characters. Thus, each chunk cannot be unambiguously parsed independently, since the true state of an XML parser at the beginning of a chunk is unknown until preceding chunks are parsed.

Previous work of the inventors [6, 9] addressed this problem by using a fast preparse scan to build an outline of the document that is called the skeleton. The preparse was then used to guide a full parse using libxml2 [16]. This preparse is a sequential stage, however, which fundamentally limits scalability per Amdahl's law [1].

2. Data Parallel XML Processing

One approach to parallel XML parsing might be to pipeline the parsing by dividing it into stages. Each stage would then be executed by a different thread. This approach can provide speedup, but pipelines are usually designed specifically for a fixed number of execution units, and thus such an implementation could not easily adjust to varying numbers of cores.

More promising is a data parallel approach. Here, the data, in this case the XML document, is divided into some number of chunks, which are then all parsed in parallel by separate threads, one for each chunk. As the chunks are finished, the results are merged back together to form the complete result. The difficulty with this scheme, however, is that dividing the document into chunks with equal numbers of characters would create chunks beginning at arbitrary locations within the XML document. Thus, all chunks except the first would begin at a character of unknown syntactic role, such as in a tag name, an attribute name or value, element content, etc. The parser would not know the state at which to begin the chunk.

The area near the beginning of each chunk could be searched to attempt to unambiguously determine the syntactic state of the beginning of the chunk. For example, one could backtrack from the beginning of the chunk to find a < character, indicating the beginning of a tag. Unfortunately, the < character is also valid within a comment, where it does not indicate the beginning of a tag, so additional code logic would be needed to correctly handle all the possibilities. Thus, such ad hoc approaches are complex and error prone.

Note that there may be application-level dependencies between elements within a single XML document. These dependencies may hinder application-level parallelism before the document is fully parsed, but do not preclude parser-level parallelism (especially DOM-based), which is an aspect addressed by the present invention.

A number of approaches try to address the performance bottleneck of XML parsing. Software solutions include schema-specific parsing [4, 14] and lazy parsing [8]. Schema-specific parsing leverages XML schema information, by which the specific parser (automaton) is built to accelerate the XML parsing. With lazy parsing approach, a skeleton is also built from the XML document to indicate the basic tree structure, then, based on the user's access requirements, the required piece of the XML document will be located through the skeleton and be fully parsed. This approach seeks to do partial parsing on the whole XML document on demand so that time can be saved. Though all these approaches are trying to boost XML parsing speed, they differ fundamentally from parallel XML parsing since their focus is to speed the process of parsing, while the main point of the parallel XML parsing is understand how to parallelize the process.

Hardware based solutions [5, 15] are also promising, particularly in the industrial arena. These approaches, however, require specialized hardware, while this approach can applied to any machine with multiple cores.

See, for example, U.S. Pat. No. 6,892,237, expressly incorporated herein by reference.

SUMMARY AND OBJECTS OF THE INVENTION

The present invention demonstrates how to parallelize the preparse itself, and thus greatly reduce the sequential stages of the parallel parsing process. libxml2 is leveraged for the full parse, and thus the technique supports all XML features that libxml2 does. The output DOM is preferably simply the output of libxml2, thus simplifying the integration of parallel XML parsing into existing applications that use libxml2. Of course, other parsers may be employed as appropriate.

The preparser is parallelized by first modeling it as a finite state automaton with actions on each transition. The term DFA is used to denote deterministic automata with actions on transitions, which is somewhat different from that suggested in most textbooks. The automaton is then transformed to a new DFA, which is called a meta-DFA, whose transition function effectively runs multiple copies of the original automaton simultaneously. Each contained copy of the original automaton is called a sub-DFA. For each state q of the original automaton, the meta-DFA incorporates a complete copy of the automaton as a sub-DFA which starts at the state q. So the meta-DFA would start execution at the beginning of a chunk with its first sub-DFA in state 0 of the original preparser automaton, its second sub-DFA in state 1 of the original preparser automaton, etc. The meta-DFA thus avoids the problem of determining the state at the beginning of a chunk by essentially pursuing all possibilities simultaneously.

It is noted that, if information is available to make certain states more likely that others, than the algorithm may be modified to allocate more of its resources to the more likely states, to give a statistical speed advantage, if evaluating all parse paths simultaneously would strain resources. Thus, the full parsing can commence with partial results available, subject to a stall if a required evaluation is absent.

Likewise, if some states are known or predicted to have greater complexity for evaluation, these may be distributed to computing cores which have a higher capability than cores to which predicted low complexity evaluation states are distributed. For example, a current trend is to perform computational tasks on massively parallel computing arrays, as are found in modern computer graphics processors (GPUs). These systems, such as the nVidia Tesla, which operates under CUDA, permit common instructions to be executed by a series of processors, and thus while the raw computational ability is high, the independent control is limited. However, some preparsing tasks may be appropriately implemented on these devices. It is noted that a typical system has both a GPU and CPU, each of which may have multiple cores, providing an opportunity for discrimination in the task allocation process.

It is further noted that even with identical processors, the clock speed may be modulated as required by a task, to control power dissipation. Indeed, forthcoming chip designs may have a thermal envelope which may be exceeded by unconstrained operation of the device, and therefore rationing power dissipation for various tasks may be a requirement.

Since the meta-DFA is also a DFA, the simultaneity is conceptual only, and can be executed by a single core. Because this technique is a generic transformation applied to the original preparsing DFA, it is also easier to implement, debug, and maintain than ad hoc attempts at parallel XML parsing.

Using meta-DFA constructed from the preparser, the document is divided into equal-sized chunks, and the preparsing meta-DFA executed in parallel on each chunk. Each sub-DFA generates a separate partial skeleton per chunk, all of which but one correspond to incorrect preparser states used to begin the chunk. When execution is complete, the partial skeletons are merged, and incorrect ones are discarded.

Tests on a 30 CPU Sun E6500 machine demonstrate good scalability at least to 30 CPUs. Indeed, while the present system does not attempt to exploit fast inter-core communications, there is no reason why this could not be implemented with associated expectation of improvement in performance.

Operating systems usually provide access to multiple cores via kernel threads (or LWPs). It is generally assumed herein that threads are mapped to hardware threads to maximize throughput, using separate cores when possible. Further details of scheduling and affinity issues may be addressed using techniques known in the art.

2.1 Preparsing

In previous work of the inventors, [6, 9], it was shown how parallelization issues could be addressed by a two-stage parsing of the XML document, namely a quick sequential scan of the document which is then used to guide a full parsing stage producing libxml2 DOM output. The initial scan is known as the preparse, and its purpose is to determine the tree structure of the elements in the document. With the structural information, the XML document can then be partitioned into well-balanced document fragments and then fully parsed in parallel. Well-balanced is used to mean that the XML fragment begins with a start-tag and ends with the corresponding end-tag. The full parse is performed using unmodified libxml2 [16], which provides APIs sufficient to parse well-balanced XML fragments. Finally parsing results of each parallel thread (the DOM fragments) are spliced together to form the final DOM object. Full details on PXP are given in [6, 9].

2.2 Skeleton

Many of the syntactic units defined by the XML specification [18], such as attributes, namespaces, and even the tag name, are not considered in the preparse. Neither does the preparse need to verify any well-formedness constraints, since these can be verified later during the full parse, for example by libxml2. The preparsing thus treats the XML document as simply a sequence of unnamed start- and end-tag pairs, which is called the skeleton of the XML document. This simplicity does not limit the XML which the parser can be used for, since all other XML features are handled in the subsequent full parse.

It is noted that the present invention is not limited to parsing of XML documents, and indeed, no such limit is intended. Rather, XML parsing represents a class of problems in which an arbitrary portion of an object has an unknown or ambiguous state, and appropriate processing of that document requires a knowledge of the state. However, the speed of execution of the process may be improved if parallel speculative execution techniques are employed, in which some or all of the possible states are evaluated absent express knowledge of the correct state. Thereafter, as the actual state becomes known, the correct speculatively-executed transition sequence be promoted, and the incorrect speculatively-executed transition sequence demoted or killed. Indeed, this technique is also applicable to cases in which the actual state is not defined until a later time. Therefore, rather than stalling the evaluation until the state is defined, the process may proceed in parallel presuming that one of the presumptive states is the correct one, and that when the actual state is known, the result will then be available with low latency.

It should be clear that by speculatively executing possibly incorrect transition paths (that are later abandoned), the system is inefficient with respect to computational "work" per executed instruction. However, in many cases, computer systems are designed with an excess of computational capacity for the average condition, and therefore fully loading the processor(s) during this process exploits an otherwise expiring resource in a multi-purpose system. Indeed, even in a dedicated system, computational processing power is relatively low cost, and in many instances, the processing latency imposes a high cost, so the parallel speculative execution is deemed efficient.

The skeleton is stored in memory as an array of items containing information about each XML element. There is one item for each element, and the item contains the start and end position of the element. The order of items in the skeleton corresponds to a depth-first ordering of the represented elements.

In order to identify the textual range occupied by an element, the preparser maintains a stack of incomplete items. When a start-tag is seen, the preparser creates a skeleton item with the starting position of the element and appends it to the skeleton array. Meanwhile, it also pushes a reference to the item on its stack. Since start-tags and end-tags of an XML document must strictly match in a paired fashion, when the end-tag is encountered, it must belong to the top item on the stack. It thus fills in the ending position in the item, and pops the item reference off the stack. Therefore, when a well-balanced XML fragment is completely preparsed, the stack must be empty.

It is therefore an object of the invention to provide a method of preparsing a data object having a data structure comprising a hierarchy, comprising dividing the data object into a plurality of chunks; evaluating a chunk based on a plurality of potentially valid initial states; generating, from a plurality of potentially valid initial states of the chunk, a skeleton representing a hierarchical arrangement of the data in the chunk and an end state of the chunk; selecting the skeleton for an actual initial state of the chunk; and using the hierarchical arrangement of the data in the chunk and end state of the chunk to interpret a subsequent chunk of the data object.

It is a further object to provide a method for processing an input file or stream, comprising receiving a definition of an original finite state machine; transforming the original finite state machine to a plurality of corresponding finite state machines, each corresponding finite state machine having an output equivalent to the original finite state machine subject to a different respective starting state; receiving a data object subject to a plurality of possible starting states; processing the data object with the plurality of corresponding finite state machines; and selecting an output of one corresponding finite state machines corresponding to a proper starting state for the data object.

It is a still further object to provide a computer readable medium, storing therein instructions for controlling a programmable processor to perform the steps of receiving a data object having a parsable hierarchical structure and one of a finite number of possible starting states; processing, the data object with a plurality of finite state machines each corresponding to a different respective one of the finite number of possible starting states; and selecting an output of one finite state machine corresponding to a proper starting state for the data object.

Another object provides an apparatus adapted to process an input file, comprising an input adapted to receive at least a portion of a data object having a hierarchical structure parsable by a finite state machine, and having one of a finite number of possible starting states as an actual starting state; a memory storing a definition of the finite state machine, transformed for each of the possible starting states; at least one processor, having a plurality of processing resources available concurrently, adapted for: processing the at least a portion of the data object with the transformed finite state machines to analyze the hierarchical structure; determining a valid one of the possible starting states; and an output adapted to present at least the hierarchical structure associated with the analyzing by the transformed finite state machine associated with the valid one of the possible starting states.

A set of remnants from state transitions of an earlier data object may be used to resolve a later data object, and the structure of a later data object may be interpreted based on remnants from an earlier data object. The remnants are, for example, unmatched results from state transitions. The processing of remnants may be separate from the processing with the finite state machine.

In some cases, at least one of the plurality of corresponding finite state machines results in a dead state from which there is no valid transition, and therefore all subsequent processing predicated on the respective state may be terminated. In other cases, the starting state must be resolved in order to determine the correct output state of a processed data object or portion thereof.

The data object is, for example, part of a series of data objects, each data object having an end state corresponding to a begin state of a next data object, and having a set of remnants from unmatched state transitions, wherein a hierarchical structure of a set of data objects is determined based at least on the state analysis with the finite state machines and the remnants.

A system for executing the method is, for example, a multicore processor, having a plurality of processing cores each adapted to processor portions of a data object in parallel, memory for storing executable code, memory for storing the portions of the data objects, analysis results, and remnants, and an output, which, for example, may be used as an input for a definitive parsing of the data object in accordance with a determined hierarchical structure or skeleton of the data object. The apparatus may further be adapted to segment the data object into chunks for processing. Likewise, the apparatus may further define a set of transformed finite state machines, each representing a possible starting state for a data object, from a generic finite state machine.

BRIEF DESCRIPTION OF THE DRAWINGS

FIG. 9 shows the structure of 1kzk.xml.

DETAILED DESCRIPTION OF THE PREFERRED EMBODIMENTS

3. The Meta-DFA

Preparsing is a sequential stage before the parallel parsing, and limits the scalability of the PXP technique to about four cores. By parallelizing the preparsing stage, additional improvements in performance may be obtained. Fundamentally, preparsing is sequential because the state of the preparser at the beginning of each chunk cannot be determined without preparsing all preceding chunks. Such limitation cannot be eliminated, but can be addressed in a manner such that parallel preparsing is still feasible.

3.1 A Model for XML Parsing

A model of XML parsing is initially defined which includes the parallel preparser. It is assumed that an XML parser is based on a deterministic, finite state automata (DFA). At every state, a number of transitions can be made depending on the next input character. Attached to each transition is an action of some kind. What the action actually does in the model itself is not directly defined. Rather, each specific XML parser (or preparser) will have a different set of actions, and may have different implementations of those actions. As discussed above, the technology is not limited to XML parsing, and may be readily applied to other problems having a similar character. For example, actions may create DOM objects, manipulate data structures, etc. In the present model, however, actions are abstract. Note that XML is not regular, thus cannot be formally recognized by a DFA. In practice, however, most XML parsers are based on some state machine, and use structures like stacks to handle non-regular aspects.

An XML parser is modeled as a DFA defined by $$M=(Q,\Sigma,A,t,q_0,\nu)$$

Where Q is a set of states, $\Sigma$ is an alphabet of possible input characters, A is a set of actions, t is a transition function, and $q_0$ is the start state. The special action $\nu$ is a no-op action. The transition function maps from the current state and input character to a new state and an action:

$$t:Q\times E \rightarrow (A \cup \nu)$$

As the machine executes, it enters a sequence of states. As it makes transitions, it also encounters a sequence of actions.

Figure 14:
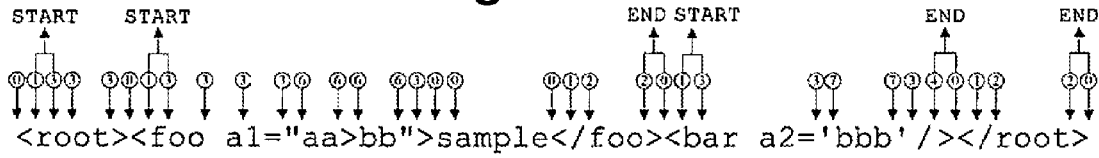
FIG. 14 shows the execution by the automaton in FIG. 15 when processing the shown XML.
Figure 15:
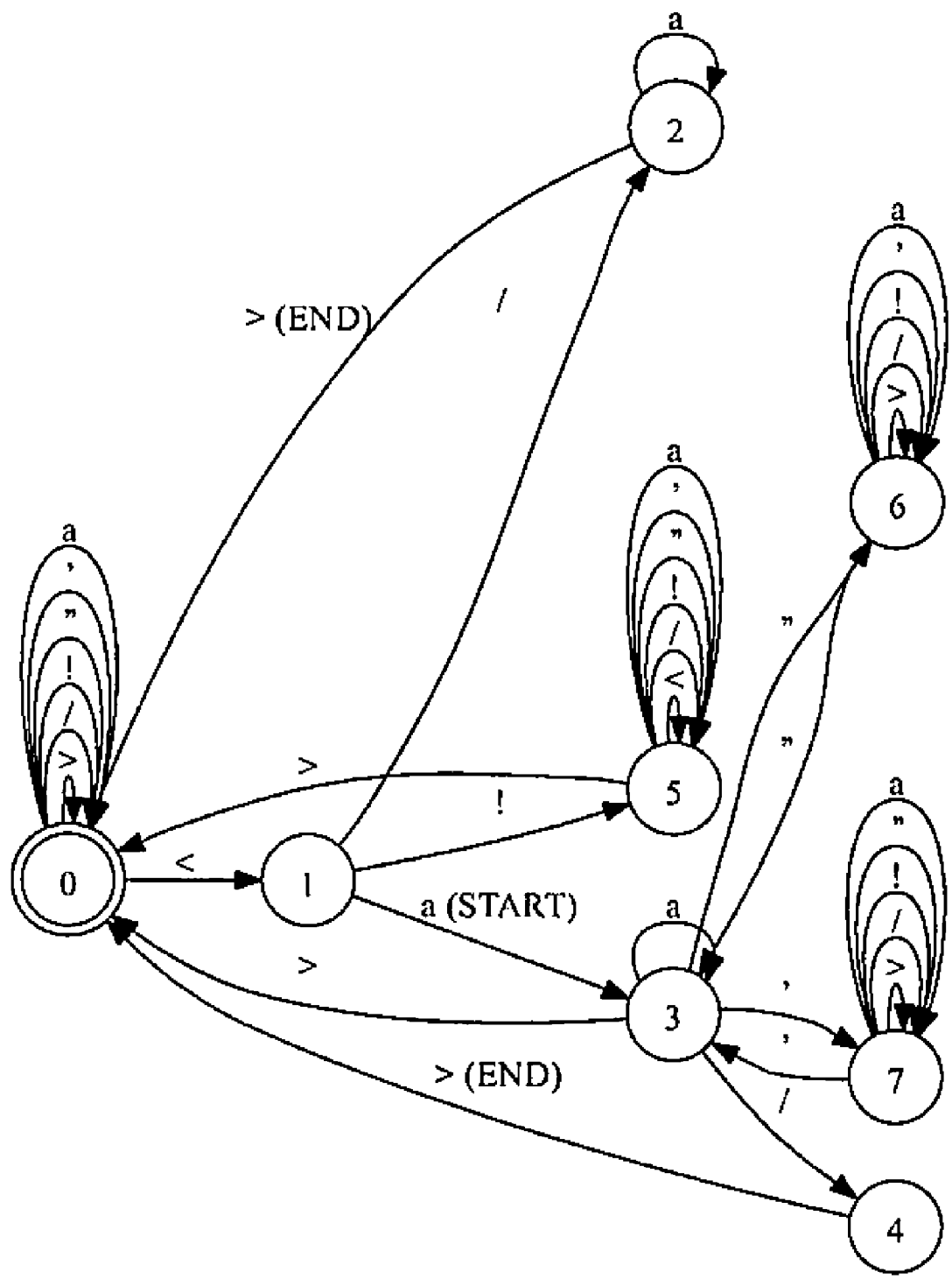
FIG. 15 shows a simple automaton which can be used to preparse XML and generate a skeleton.

In FIG. 14, an XML fragment is shown, and the corresponding execution for the XML processing automaton is shown in FIG. 15. Since each chunk must be processed in parallel, before the previous chunk has been completely processed, the true state before the first input character is unknown. Suppose a thread has now been assigned an XML chunk, starting with the character "b". In the XML string shown in FIG. 14, initially the true automaton state could be 6, 1, or 7. When the automaton encounters the first "r" character, it will move from state 1 to state 3, and perform the START action. The transition from state 0 to state 2, for example, is taken on the > character, and has the END action.

One approach to processing this data would be to use some kind of searching in the area near the beginning of each chunk, to attempt to unambiguously determine the grammatical state of the beginning of the chunk. For example, an algorithm could backtrack from the beginning of the chunk to find a < character, indicating the beginning of a tag.

Unfortunately, the "<" character is also valid within a comment (or a CDATA section), where it does not indicate the beginning of a tag. It could be assumed that this is unlikely, and proceed as if the first "<" before the start of the chunk does in fact indicate the beginning of a tag. Eventually, after all preceding chunks have been parsed, the state at the beginning of the chunk would be positively determined. If this determination is that the beginning of the chunk is actually within a comment, the chunk would then require reprocessing with the true initial state.

This would be expensive with respect to the goal of speeding processing, but since the "<" character is presumably not commonly within a comment, the cost would not be incurred very often.

Such techniques are essentially a form of speculative execution. The DFA state at the beginning of a chunk is unknown at the start of execution, but certain assumptions can be made. If the assumptions are wrong, a performance penalty is incurred. But if the assumption is usually correct, then the average performance may be improved. This form of speculative processing could be implemented as suggested, by adding code to search, backtrack, etc. It would be complex and error-prone, however.

Another approach which may be simpler to implement, is to simply assume that the true state at the beginning of a chunk is the most commonly occurring state, and begin execution in that state. For example, given the automaton in FIG. 15, if expected documents mostly contain character content, the true initial state for a chunk is likely to be state 0. The automaton is then executed as far as possible. If an error is encountered, then either the assumption was incorrect, or the input is invalid. In either case, the thread must then wait for all preceding chunks to be processed, before reprocessing the chunk in the definitively true state. If no error was encountered, then the thread also waits for all preceding chunks to be completed. However, as long as the preceding chunk finishes in the state assumed for the beginning of this chunk, then no reprocessing is needed. As long as the assumption is usually correct, average performance will be improved.

The above approach amounts to taking a single guess at the initial state, processing the chunk, then waiting for the preceding thread to pass the positively determined state. If the guessed state was wrong, then the thread must reprocess the chunk using the correct initial state. Thus, wrong guesses can result in sequential execution.

This speculative processing technique can be used in conjunction with the Meta-DFA described below.

3.2 Meta-DFA Definition

The meta-DFA construction transforms the original DFA to a meta-DFA whose transition function runs multiple instances of the original DFA in parallel via sub-DFAs. For each state q of the original DFA, the meta-DFA includes a complete copy of the DFA as a sub-DFA which begins execution in state q at the beginning of the chunk.

The meta-DFA thus theoretically pursues simultaneously all possible states at the beginning of the chunk. Since the meta-DFA is also a DFA, the simultaneity is strictly conceptual, and can still be executed by a single core. As stated above, in the event that concurrent execution an evaluation of all possible states is not possible, it may be possible to estimate the most likely states, and evaluate those first or in a manner likely to produce an output soonest. If this estimate is correct, and this is recognized, further processing of incorrect state parallel tasks may be avoided.

Each state of the meta-DFA is an element from the Cartesian product of the states of the original DFA. The start state of the meta-DFA is simply a vector where the first element is the first DFA state, the second element is the second DFA state, etc.

The meta-DFA construct is now precisely defined. Though the meta-DFA is also a DFA, for clarity, states of the meta-DFA are referred to as meta-states, and the actions of the meta-DFA as meta-actions. Actions of the sub-DFA may be referred to as subactions when necessary. When not qualified with sub- or meta-, it is assumed herein that the meaning is clear from context.

Given a DFA as above, the meta-DFA is defined as $$M=(P,\delta,\Sigma,A,\upsilon,\tau,p_0)$$

Let $N=|Q|$. Then $P$ is the Cartesian product $(Q \cup \delta)^N$, $A$ is the Cartesian product $(A \cup \delta)^N$. The start metastate $p_0=[q_0, \ldots, q_{N-1}]$. The transition function $\tau$ is defined as, for all $c \in \Sigma$:

$$\tau([q_{j_1}, \ldots, q_{j_N}], c) \to ([g_{k_1}, \ldots, q_{k_N}], [a_{l_1}, \ldots, a_{l_N}]) \Leftrightarrow$$

$$\forall\, i \in [1, N] \begin{cases} t(q_{j_i}, c) \to (q_{k_i}, a_{l_i}) : \text{if } t(q_{j_i}, c) \text{ exists} \\ q_{j_i} = \delta \text{ and } a_{l_i} = \upsilon : \text{otherwise} \end{cases}$$

In other words, within the metastate vector, a sub-DFA goes from state $q_{j_1}$ to $q_{k_1}$ on character $c$, iff the original DFA also had $t(q_{j_1},c)=q_{k_1}$. The states of the original DFA are augmented with a special dead state, $\delta$. This indicates in the metastate that the original DFA had no transition on this input character. Once a sub-DFA enters the dead state, it can never exit, indicating that the sub-DFA encountered invalid input.

Figure 1:
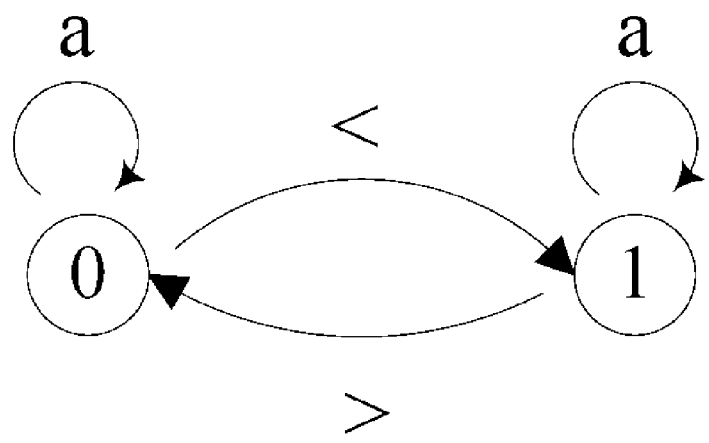
FIG. 1 shows a diagram of simple DFA.
Figure 2:
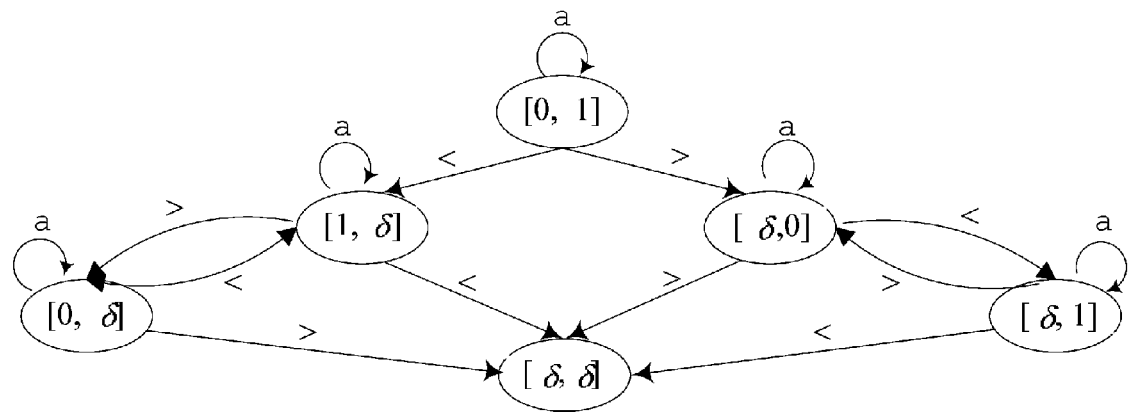
FIG. 2 shows the constructed meta-DFA from the DFA in FIG. 1.

FIG. 2 shows a meta-DFA that has been constructed from the DFA in FIG. 1. As shown in FIG. 2, the process starts from the initial metastate vector [0, 1], and considers every possible input character. This forms two new meta-states [1, $\delta$] and [$\delta$, 0]. ($\delta$ is the dead state and $\delta$ on any input will transition to itself.) The meta-DFA construction is continued on each new metastate.

When the meta-DFA makes a transition, it also executes a meta-action. The meta-action is a vector of subactions, one for each sub-DFA. These subactions are the same as the original action that would have been taken by the original DFA.

In the original DFA, the actions operated on some kind of whole parser state, such as the DOM data structures that it might be constructing. Note that use the word state is occasionally used herein in its more general sense, rather than to denote the state of an automaton. The meta-DFA, however, is pursuing multiple possibilities simultaneously or concurrently, and thus an instance of the meta-DFA must maintain multiple copies of this originally single state. Therefore, each original action must now be executed as a subaction within a separate context, corresponding to each sub-DFA. Furthermore, these actions may need to be modified to handle the fact that preceding actions may not have been executed because they were in a different chunk. Each sub-DFA essentially begins execution on an empty parser state within its context. For example, an action to add an element to a parent cannot assume that the parent exists. This additional code logic could be complex in a full XML parser, but turned out to be relatively simple since the meta-DFA only needed to be applied to the much simpler preparser.

If a sub-DFA enters the dead state, that means that its context and execution have died. A live context and execution thus correspond to a sub-DFA that is not in the dead state.

Figure 3:
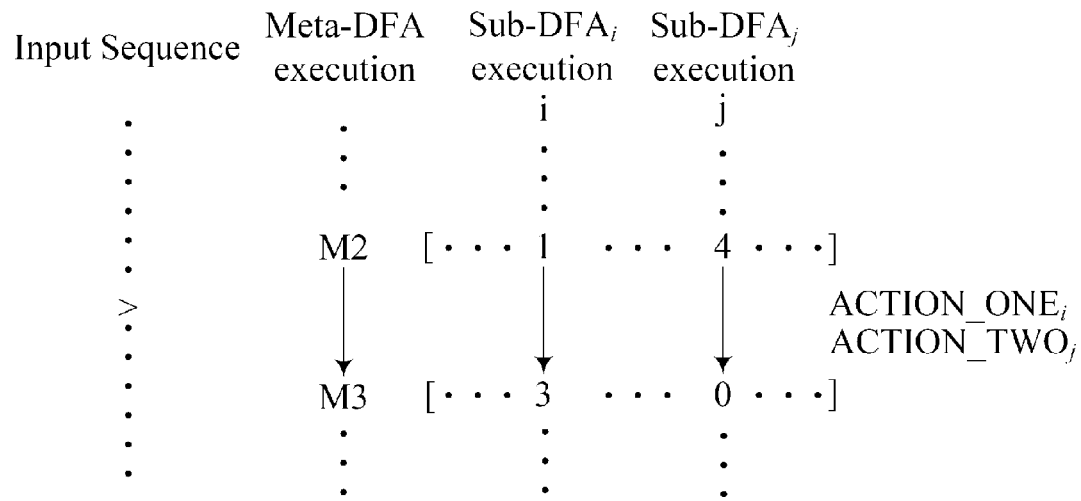
FIG. 3 shows a meta-DFA transition on the character >, and the execution of the sub-DFAs.
Figure 4:
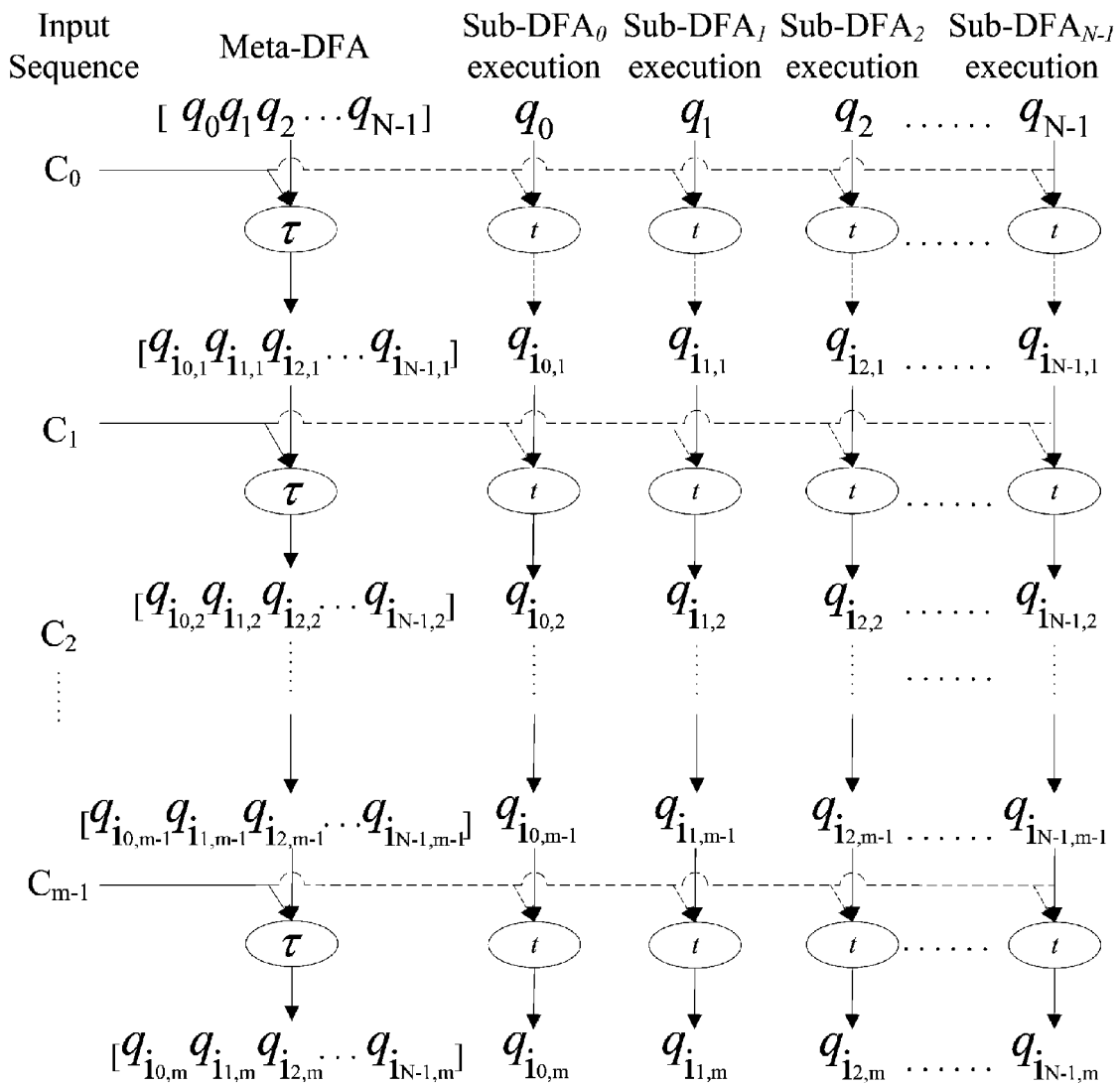
FIG. 4 shows execution of a meta-DFA on a character sequence of length m, and its relationship to sub-DFAs.

As an example, FIG. 3 shows one transition of a meta-DFA, which has two sub-DFAs, sub-DFA, and sub-DFA. Internally, the meta-DFA maintains separate executions for these two sub-DFAs. When the meta-DFA makes a transition from metastate M2 to M3 on encountering the > character, sub-DFA, makes a transition from state 1 to 3, and sub-DFA makes a transition from state 4 to 0. The subactions are ACTION_ONE, executed in context i, and ACTION_TWO, executed in context j. The execution of a meta-DFA on a character sequence of length m, and its relationship to sub-DFAs is shown in FIG. 4. Seen from sub-DFAs, the meta-DFA transitions from a vector of states to another vector of states. The transition function $\tau$ of the meta-DFA accepts an input character $c_j(j\in[0, m-1])$ and transitions to another vector of states, with the destination state in each vector element determined by the original transition function t on the same input character $c_j$. In the graph, $q_{i_{k,l}}(i_{k,l} \in [0,N-1]$, $k\in[0,N-1]$, and $l\in[1, m]$ is the sub-DFA state, $i_{k,l}$ is an indexed variable, $k$ is the index of the sub-DFA, l is the step number of the meta-DFA execution.

After all the chunks are parsed by separate threads, each running an instance of the meta-DFA, the complete, true execution of the original DFA can be determined. Since the thread for the first chunk can run the original DFA unambiguously in the start state, the ending state of the first chunk is definite. This ending state is then used to select the true execution of the second chunk. The ending state of the true execution of the second chunk is then used to select the true execution of the third chunk, and so on and so forth.

Based on this propagation of states, in some cases it is possible to estimate during evaluation of a chunk, what the end state will be, and this information used to control execution of subsequent meta-DFAs. Clearly, if the task is sufficiently complex such that earlier chunks are completely processed before later chunks commence processing, then the state vector-space which needs to be speculatively explored for the later chunks is correspondingly limited.

The number of metastates is potentially very large, but most of the metastates are unreachable, and thus do not need to be actually generated. Furthermore, the meta-DFA is used for preparsing only, which is quite small. The meta-DFA used in the example reported below had 611 states. This number has been found to be manageable. This is discussed in Section 5.1.

The selected chunk size may be optimized based on an estimated complexity of the chunk, which may be derived from a history of analysis of documents of the same type, adaptive analysis of other chunks, or even a preliminary analysis of the chunk itself or the document as a whole. That is, the time for processing a chunk is not directly related to its length, though on a statistical basis this may be true. Based on this determined or predicted complexity, an optimization may be performed to define a chunk size such that the number of parallel processes which must be run for each chunk, based on the number of possible starting states to be considered, the number of possible starting states from which no valid transition is possible, the number of resources available for parallel processing (e.g., processing cores), and the possibility of avoiding non-productive processing based on false starting states if earlier results are available. Thus, assuming that the goal is to obtain the preparsed results the fastest, and that there is no incremental cost for consumption of computing resources, then the optimum chunk size is the one which is small enough to allow a reasonable amount of parallelization of relatively low complexity tasks, to provide a speedup of processing, while being large enough to avoid an undue proliferation of non-productive tasks and a large post-processing task of addressing remnants.

3.3 Implementation

Te meta-DFA construction was implemented as a program that takes an input file describing a DFA with transition actions, and output a source code fragment that could be used within a C++ state machine to execute the meta-DFA. Actions in the input file are output in the meta-DFA code fragment as macro invocations with a single parameter indicating the context. For example, a START action in the input DFA would be output as START (2) to indicate that the START action should be executed now within the context of sub-$DFA_2$.

Thus, the computer readable program instructions are stored in a computer readable medium, such as a semiconductor or magnetic memory, and supplied to a processor to implement the method. In so doing, the apparatus assumes a special purpose. Likewise, the algorithm implemented by the special purpose apparatus performs a transformation on the input, yields a qualitatively different form of information, though the original content is carried through. Therefore, the processing results of the special purpose apparatus are similar or identical to a traditional system, while the internal operation is different and the output generated with shorter latency.

The algorithm to generate the meta-DFA is similar to the subset construction algorithm to convert NFAs to DFAs. One difference, however, is that a set of states cannot be used, but rather a vector must be used. This is because separate execution contexts for each sub-DFA must be maintained. The initial state of the meta-DFA is $[0, 1, 2, \ldots, N-1]$. A todo_list is maintained, which is initialized with only the initial state of the meta-DFA. On each step, the algorithm takes out the head element of the todo_list, and then for each possible input character, forms the next metastate according to the transition function definition above for t. Then, if the next metastate is new, it is added to the end of the todo_list as new work to do. The process proceeds until the todo_list is empty. The pseudo code of the meta-DFA generation is given in Algorithm 1.

---

Algorithm 1: Algorithm to generate a Meta-DFA from a DFA. N is the total number of DFA states.

Data: The DFA $M = (Q, \Sigma, A, t, q_0, \nu)$
Result: The Meta-DFA $\mathbf{M} = (P, \delta, \Sigma, A, \nu, \tau, p_0)$
ListOfMetaStates todo_list $\leftarrow p_0$;
while todo_list $\neq \emptyset$ do
    MetaState $p_{cur} \leftarrow$ Remove head from todo_list;
    for each input character $c \in \Sigma$ do
        MetaState $p_{next}$; MetaAction Vector $a'_{next}$;
        for $i \leftarrow 0$ to $N - 1$ do
            $q_{src} \leftarrow p_{cur}[i]$;
            if $q_{src} \neq \delta$ then
                DfaTransition
                $t_{cur} \leftarrow$ Find transition in $t$ from $q_{src}$ taking $c$;
                if $t_{cur}$ exists then
                    if action exsists on $t_{cur}$ then
                        specify an action $a_{l_j}$ as the action on $t_{cur}$ but only operates on context $i$;
                        $a_{next}[i] \leftarrow a_{l_j}$;
                  else
                      $a'_{next}[i] \leftarrow \nu$;
                  $p_{next}[i] \leftarrow$ destination state of $t_{cur}$;
                else
                    $a'_{next}[i] \leftarrow \nu$; $p_{next}[i] \leftarrow \delta$;
            else
                $a'_{next}[i] \leftarrow \nu$; $p_{next}[i] \leftarrow \delta$;
        if $p_{next} \notin P$ then Add $p_{next}$ to $P$ and to the tail of todo_list;
        Add a transition to $\tau$ from $p_{cur}$ to $p_{next}$ accepting the character $c$ and executing the actions in $a'_{next}$;

---

Since the original DFA is finite, the meta-DFA is clearly also finite. The construction algorithm is thus guaranteed to terminate. Once the algorithm has terminated, the metastates can be enumerated and assigned a state number. Execution of the meta-DFA is thus the same as a DFA.

To visualize the meta-DFA construction process, a very simple DFA shown in FIG. 1 is used as an example, and its generated meta-DFA is shown in FIG. 2.

4. Transforming the Preparser

Figure 5:
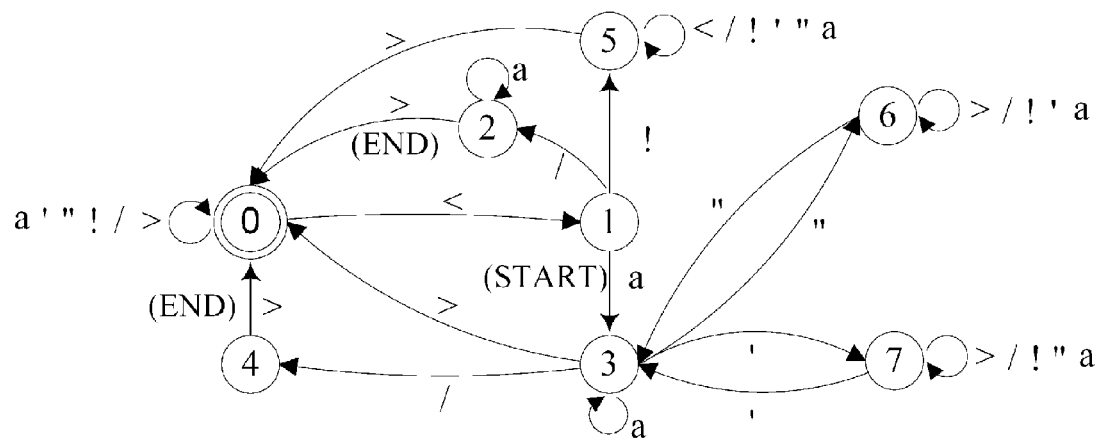
FIG. 5 shows an automaton used to preparse XML and generate skeleton, in which the transition from state 2 to 0, for example, is taken on the > character, and has the END action.

To apply the meta-DFA approach, the preparser is first modeled as a state machine as a DFA with actions on the transitions. Because the skeleton only contains the beginning and ending of each element, the DFA for the preparser only needs to recognize enough to support this distinction. Clearly, if the preparsing task were different, other attributes could be analyzed. Furthermore, because the preparse is followed by a full parse, the preparse is allowed to accept ill-formed XML. Such XML will be rejected later in the full parse. As a result, the DFA can be quite simple, and is shown in FIG. 5. The work in [6] showed that preparsing is an order-of-magnitude faster than full XML parsing.

The XML preparser is responsible for finding the beginning and ending of each element, and consequently its DFA requires only two actions, START and END. The START action is used to signify the start of an element, while the END action signifies the end of an element. Referring to FIG. 5, the START action occurs on the transition from state 1 to state 3. The END action occurs on the transition from state 2 to state 0, and from state 4 to state 0.

For the sequential preparsing, these actions perform the following operations.

START Create a new skeleton item with the start position set to the start of the element. Push a reference to the item onto the stack.

END Edit the item on the top of the stack, filling end position of the represented element, and then pop the stack. The DFA is then represented as an input file to the meta-DFA generating program. The actions are specified simply as strings. The transformation outputs a C++ code fragment, with the actions carried along as macro invocations. The corresponding context number is given as an argument to the action invocation, so that it can be used within the action definition to isolate the action within the true context. Also, the resulting meta-DFA has 611 metastates.

4.1 Stack Remnants

When preparsing a well-formed, complete XML document, the stack is always empty at the end of the document. Furthermore, during preparsing of complete documents, the preparser uses the stack to keep track only of start-tags for which the corresponding end-tags has not yet been encountered. Because an end-tag can never appear before its corresponding start-tag, the stack never contains items with end-tags for which the corresponding start-tag is missing.

For data-parallel preparsing, however, each thread preparses in parallel on a chunk that may not be well-balanced, since the chunk divisions occur at arbitrary positions. The division will result in XML fragments with unbalanced start and end-tags. Thus, after a chunk has been preparsed, the stack could contain references to items for which the end-tag, has not yet been encountered, or references to items for which the end-tag was encountered, but not the start-tag. The items in the stack are unpaired, because the corresponding start- or end-tag is in the preceding or following chunk, respectively. This non-empty stack is called the stack remnant.

Handling unpaired end-tags requires modifying the skeleton generation logic so that if an end-tag is encountered while the stack is empty, its corresponding start-tag is assumed to be in the preceding chunk. A new skeleton item is still created, but without the start position. Because this logic is encapsulated in the actions, which are given in the generated meta-DFA code fragment as macro invocations, only the macro definitions corresponding to the actions need to be changed. Since actions are executed within a separate context for each sub-DFA, each action must execute on the stack and skeleton for that context. The redefined actions are:

START(i) Create a new skeleton item with the start position set to the start of the element, and push a reference to the item onto the stack. All operations within context i.

END(i) If the stack is empty, create a new skeleton item with the end position set to the end of the element, and push a reference to the item onto the stack. Otherwise, check whether or not the top item on the stack has its element end position set. If set, create a new skeleton item with the end position set to the end of the element, and push a reference to the item onto the stack. If not set, edit the top element on the stack, filling in its element end position, then pop stack. All operations within context i.

Figure 6:
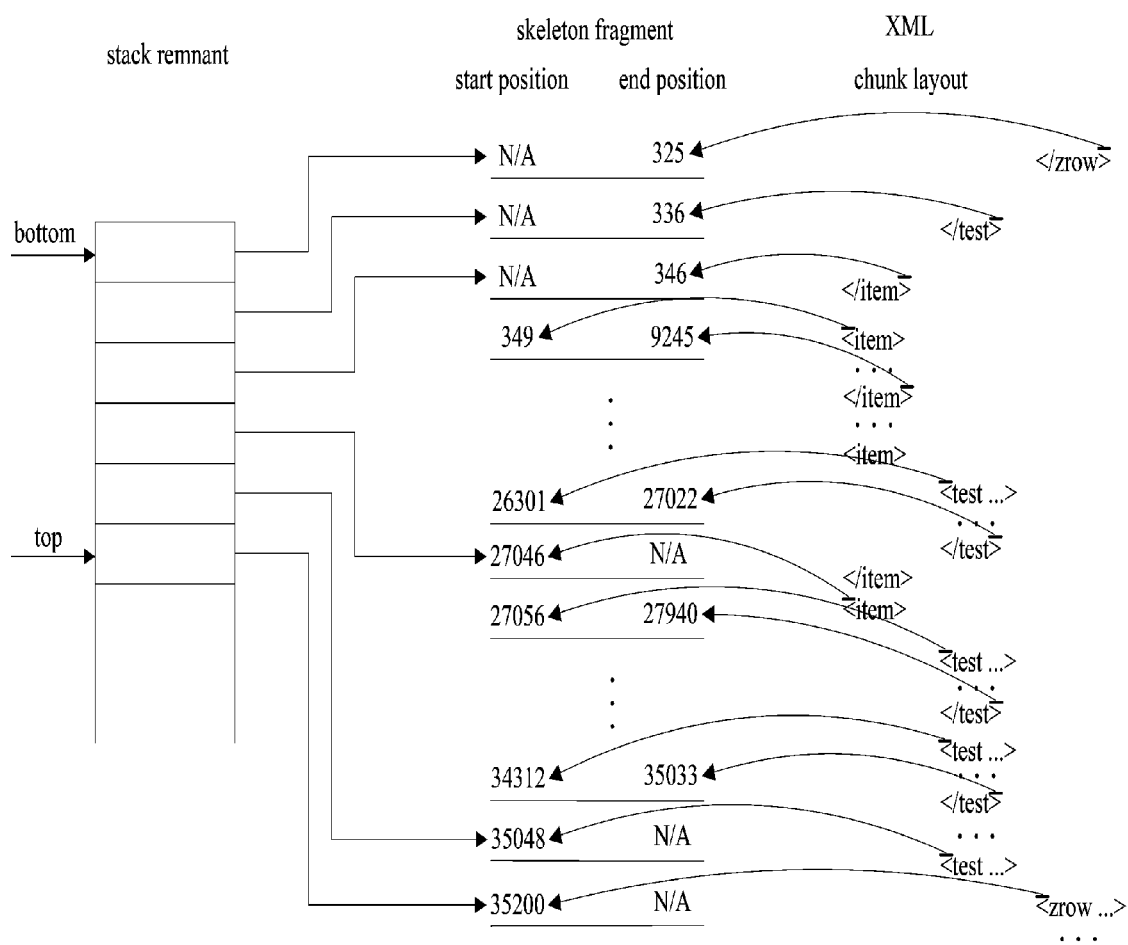
FIG. 6 shows the relationship between an XML chunk, its skeleton fragment, and the stack remnant, wherein the stack remnant contains references to items in the skeleton.

Since chunks only contain a portion of the XML document, the skeleton resulting from the preparse of a single chunk is incomplete, and is known as a skeleton fragment. The references on the stack remnant also indicate that the referent items are also incomplete. The relationship between the skeleton fragment and the stack remnant is shown in FIG. 6. FIG. 6 shows the relationship between an XML chunk, its skeleton fragment, and the stack remnant. The stack remnant contains references to items in the skeleton. On the right side, is shown the corresponding XML. Arrows from the character location in the XML chunk point to the corresponding position information in the skeleton item. As can be seen, skeleton items which are missing either start or end position information correspond to unpaired XML tags.

4.2 Skeleton Merging

Figures 7, 8:
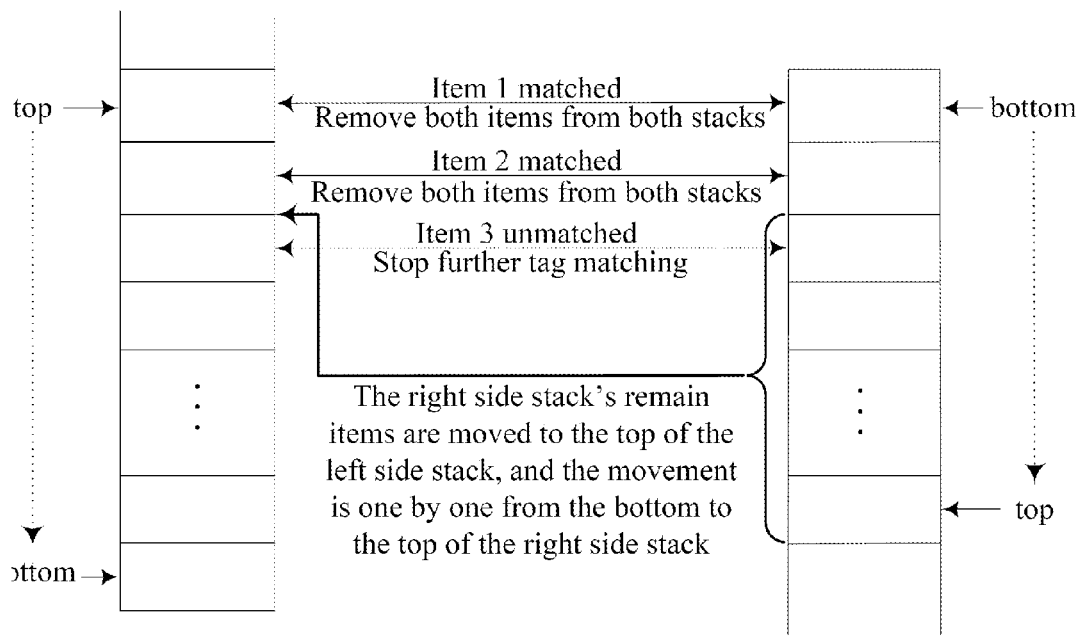
FIG. 7 shows the preparsing results for a given chunk.
FIG. 8 shows that stack remnants are used to merge skeletons.

After using the meta-DFA to preparse a chunk, the results shown in FIG. 7 are obtained. As you can see, some of the contexts will still be live. These contexts will have an associated skeleton fragment and stack remnant. The live context corresponding to the actual state at the beginning of the chunk will be the true context. Each context is in an equivalence class, which is used to remove static duplicates. Each context normally has a separate skeleton, but contexts within an equivalence class instead only have a single skeleton, which is referenced via a pointer. This can be seen in context 3, for example. A similar situation exists for the stack.

When all chunks have been preparsed, the true execution can be unambiguously determined. The execution of the first chunk is already fully determined, since the beginning of the first chunk must be the start of the document. The final state of the first chunk is thus used to select the correct context from the second chunk. The process continues until all the correct contexts are obtained. From this fully determined execution, the true stack remnants and skeleton fragments are extracted from the appropriate contexts.

Once the true context is obtained from each chunk, the skeletons are then merged, as shown in FIG. 8. The merging proceeds by matching the items referenced in the stack remnants, and updating items that match. A match here means that it is determined that a given item with a missing end-tag should be paired with an item with a missing start-tag. Items 1-2 match, because the left-side item is missing the end position, while the right-side item is missing the start position. Because Item 3 does not match, the remaining items are copied to the merging stack on the left.

A merging stack is maintained as the process proceeds. Initially the merging stack is just the stack from the first chunk. As the process proceeds, stack remnant from each chunk (from the true context) is examined, starting from the top of the merging stack, and the bottom of the other, proceeding item by item, going down the stack on the merging stack and up the stack on the other.

After merging the skeletons from all chunks, the merging stack must be empty, if the document is well-formed.

5. Performance Evaluation

To demonstrate that the technique can be applied to XML containing scientific data, molecular information from the Protein Data Bank(PDB) [10] was used, which is generally representative of a broad class of XML used in scientific applications. FIG. 9 shows the structure of the test XML document, named 1kzk.xml.

The experiments were run on a Sun E6500 with 30 400 MHz US-II processors, running Solaris 10. Every test is the average of ten runs, with a warm file cache. The programs are compiled by g++4.0 with the option −O3, and the libxml2 library was version 2.6.16.

The graphs shown in the Figures used a file sized to 34 MB, but sizes up to 56 MB were tested, which did not produce any significant difference. Below about 64 KB, per document parallel overheads start to dominate the code. The optimization of these smaller documents may be important for other applications.

5.1 Analysis of Meta-DFA Generation

In theory the meta-DFA generation algorithm may lead to a state explosion. However, the input DFA is small, since it is used only for preparsing, and furthermore, during the meta-DFA generation, most of the metastates will transition to the dead metastate. The meta-DFAs are generated for a variety of DFAs designed for parsing XML, as shown in Table 1. The results also show that different DFAs will result in different sizes of meta-DFAs, and that the number of states in the resulting meta-DFA is not just a function of the number of states in the DFA. This is in part because most of the new created metastates will just have a transition to the dead metastate. Thus, most metastates are unreachable, and never generated.

TABLE 1

Meta-DFA Construction

| Num of DFA States | Num of DFA Transitions | Num of meta-DFA States | meta-DFA Construction (μSec) | Code Generation (μSec) |
|---|---|---|---|---|
| 8 | 37 | 611 | 13738 | 108578 |
| 9 | 49 | 93 | 2918 | 27209 |
| 19 | 38 | 297 | 11850 | 90828 |
| 21 | 42 | 332 | 14395 | 134012 |
| 41 | 211 | 1214 | 107562 | 474301 |

The meta-DFA only needs to be generated once for a given XML parser, and is done entirely offline, and so does not affect actual XML parsing performance. In theory, a large number of meta-DFA states could result in overflow of the instruction cache and cause performance degradation, but this was not seen in practice. This is because most XML documents only require the meta-DFA to use a small number of the total possible metastates. The large majority of metastates are never used for most documents. Intuitively, this is because most possible interpretations of an XML chunk are quickly invalidated as more and more of a chunk is processed. For example, encountering a < in a chunk means that what follows is almost certainly a start- or end-tag.

5.2 Speedup

Figure 10:
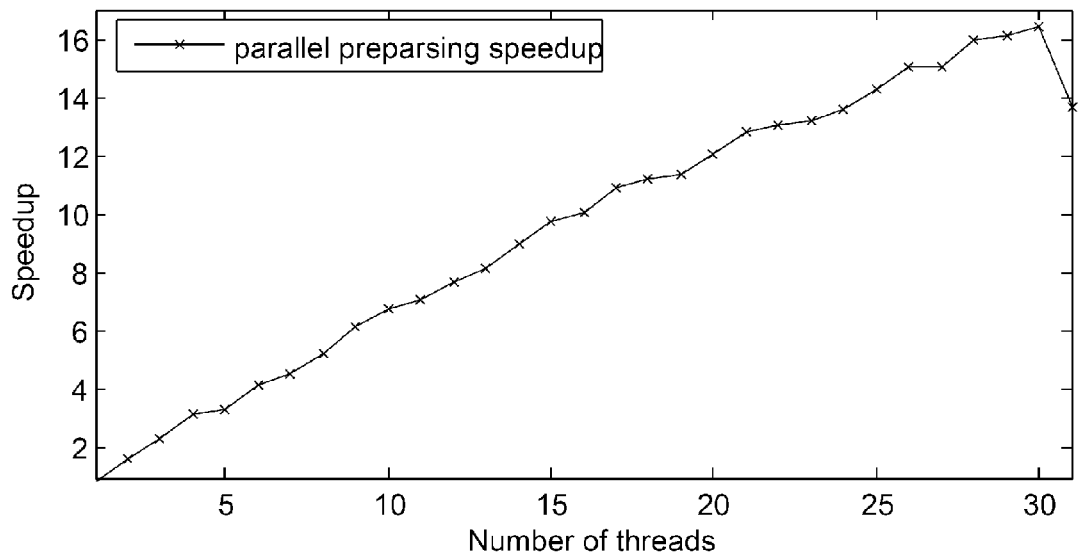
FIG. 10 shows a graph of preparsing speedup.

FIG. 10 shows the speedup of the parallel preparser relative to the non-parallel preparser. The results show that parallel preparsing can indeed take advantage of multiple processors, and scales well to 30 processors. The drop-off after 30 is because the machine only has 30 processors.

Figure 11:
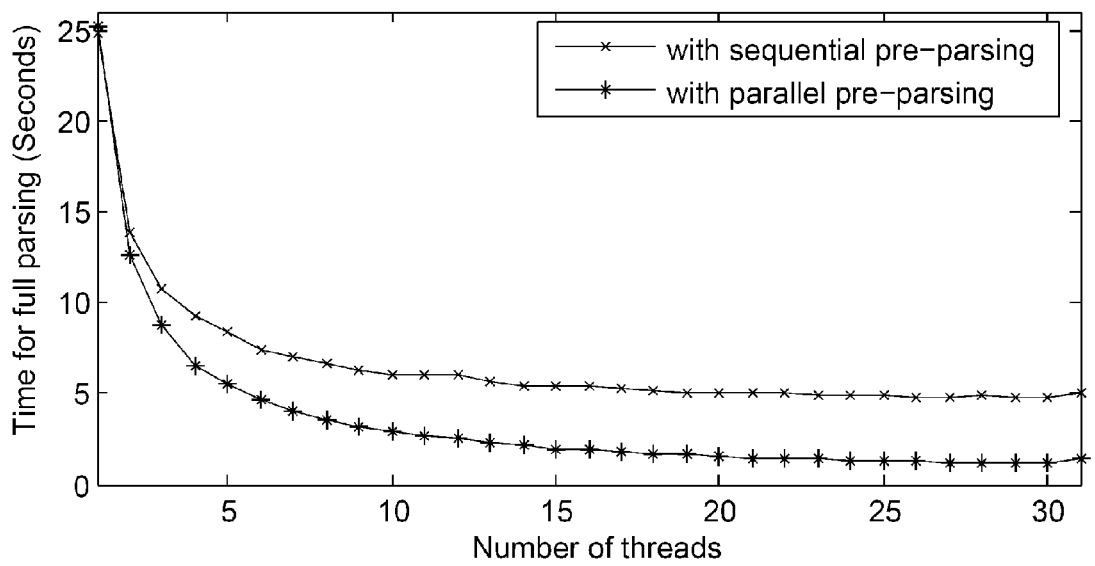
FIG. 11 shows a graph of the total time spend by the full parsing with parallel preparsing vs. with sequential preparsing.
Figure 12:
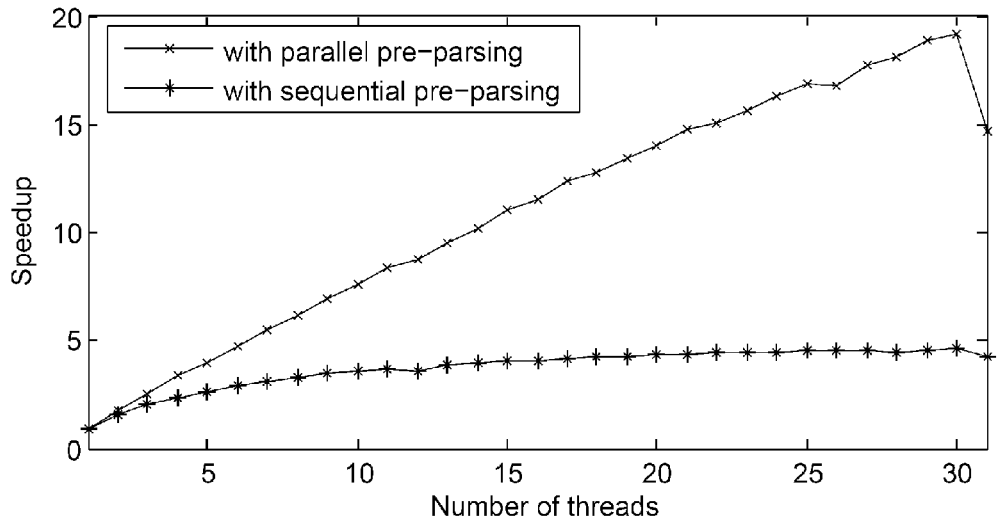
FIG. 12 shows a graph of full parsing speedup relative to libxml2.

The performance of the full PXP parsing was then tested. FIG. 11 shows the total wall-clock time spent by full parsing with parallel preparsing compared to sequential preparsing. FIG. 12 shows the corresponding speedup graph comparing PXP with parallel preparsing against PXP with sequential preparsing. The speedup is measured relative to the standalone version of libxml2. This graph shows that parallel preparsing is crucial to maintaining the scalability of PXP. The speedup curve is near straight until all 30 processors in the test machine are exhausted. PXP with sequential preparsing shows much less performance gain as the number of threads increase, and only scales to a few processors before leveling-off.

5.3 Analysis

To further improve scalability to beyond 30 cores other issues may be considered. For example, while it was initially suspected that the sequential merge stage might be a bottleneck. However, merge time turned out to be only 1/1000 of the wall clock time, even with 30 threads, and therefore could not account for the deviation from the ideal.

Figure 13:
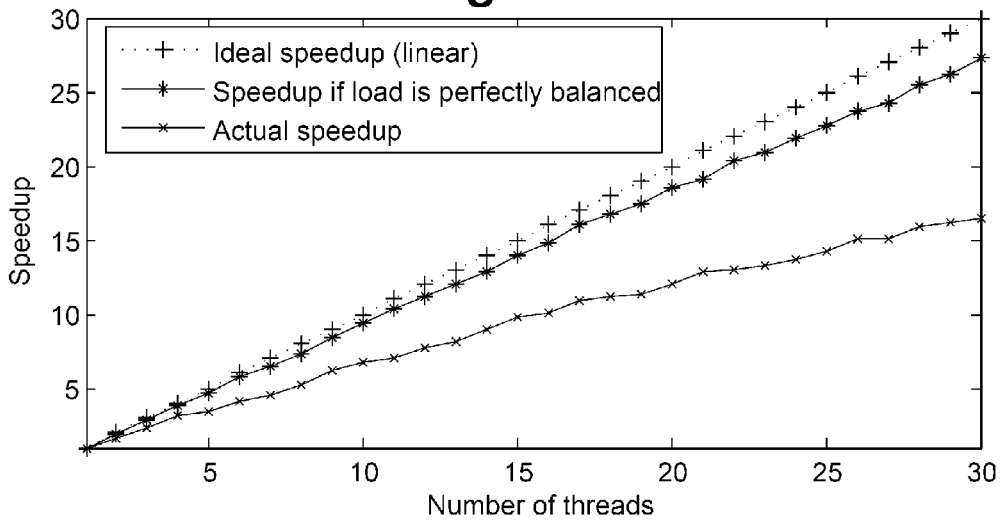
FIG. 13 shows a graph of hypothetical speedups if load were balanced.

Further investigations on this issue suggests that load imbalance is the main cause. To obtain some experimental evidence, the speedup if the load were perfectly balanced was estimated by using the equation $$\text{speedup} = \frac{S}{\frac{\sum_{i=1}^{N} T_i}{N}}$$

where S is the time required for parallel preparsing with one thread and $T_i$ is the time required by thread i during a parallel preparse with N threads. The effect of this equation is to give what the speedup would have been if the load had been perfectly balanced. The results are shown in FIG. 13 on the line associated with "Speedup if the load is perfectly balanced". This line is much more close to the ideal when compared to the actual speedup line, and thus confirmed that the workload on each thread is different, and that some chunks will be more costly to preparse than others. If the deviation from ideal was caused by overhead, for example, the artificial load-balancing computation would not help so much. The reason why some chunks cost more is that there exists different number of contexts on different chunks. In fact, the number of contexts depends on the exact character position that the meta-DFA was started in. Thus, some threads have to perform more work than others, causing them to slow down.

If a chunk is likely to require more time-consuming processing, for example a complex table structure is noted during preparsing, then that chunk may be subdivided, leading to an earlier conclusion of preparsing processing for that subdivided chunk. Note that by subdividing a chunk, the later portion of that chunk would require processing of its entire state vector space. Assuming that all processing power is consumed in the evaluation, a decision is made whether to subdivide an earlier chunk and immediately commence evaluation, so that its end state can be obtained earlier, or commence (or continue) processing of another chunk in the queue or in process. Various known optimization techniques may be applied to this problem.

6. Conclusion

A data-parallel approach to parallel XML parsing is attractive and produces a significant speedup. By selecting arbitrary starting points within an XML data object or stream, the starting state of a chunk is not definitely known, and therefore the parallel processing proceeds to consider all or some of the possibilities, before the actual state is known with certainty. The approach of transforming the original DFA to a meta-DFA, addresses this challenge by tracking all possible executions via a metastate. Operations in the original DFA are preserved by modeling them as actions, which are executed in the meta-DFA within separate contexts, thus maintaining the separation between different possibilities. The results show significant speedup when applied on the preparsing phase of the PXP. Since each meta-DFA presumes a different starting state, it is possible to simplify each respective meta-DFA for its particular application, though a generic DFA may be used for each instance with a constrained presumed starting state.

Maintaining multiple possibilities incurs a cost, however, and therefore the present invention may be used in conjunction with other techniques which exploit various strategies to reduce this cost. There are some duplications that could be eliminated, for example. Sophisticated work-stealing techniques using non-blocking synchronization may address load-imbalance issues. Applying DFA state minimization algorithms to the DFA may also show promise in reducing code size [13]. Another avenue of future work is to explore how the meta-DFA approach can be used for other types of XML processing, such as canonicalization [17].

Many variations of the invention will occur to those skilled in the art. Some variations include operating on data types other than XML, operating on asymmetric or adaptively allocated parallel processing systems, adaptive chunking of objects, using multi-processor systems (e.g., GPU-type parallel processing arrays) to evaluate the same data with different presumptions, and statistical or biased selection of processing tasks based on likely high yield processing results and likely superfluous processing results. The pre-parsing system may be distributed over time and space, and, for example, may be embedded in a network appliance or network router which processes the object as it is being communicated. Thus, the object and its preparsed skeleton may be delivered to a destination. All such variations are intended to be within the scope and spirit of the invention, which is limited only by the claims. The examples presented herein are not intended to limit the scope of the invention.

It is understood that the present invention may be executed on a variety of computing platforms, both general and special purpose, implementing specific functionality as described herein.

REFERENCES

Each of the following reference is incorporated herein by reference as if set forth in their entirety.

[1] G. M. Amdahl. Validity of the single-processor approach to achieving large scale computing capabilities. In Proceedings of AFIPS Conference vol. 30, pages 483-485, Atlantic City, N.J., 1967. AFIPS Press.

[2] K. Chiu, T. Devadithya, W. Lu, and A. Slominski. A Binary XML for Scientific Applications. In International Conference on e-Science and Grid Computing, 2005.

[3] K. Chiu, M. Govindaraju, and R. Bramley. Investigating the limits of soap performance for scientific computing. In HPDC '02: Proceedings of the 11th IEEE International Symposium on High Performance Distributed Computing HPDC-11 2002 (HPDC'02), page 246. IEEE Computer Society, 2002.

[4] K. Chiu and W. Lu. A compiler-based approach to schemaspecific xml parsing. In The First International Workshop on High Performance XML Processing, 2004.

[5] IBM. Datapower. [http://] www.datapower.com/.

[6] W. Lu, Y. Pan, and K. Chiu. A Parallel Approach to XML Parsing. In The 7th IEEE/ACM International Conference on Grid Computing, 2006.

[7] M. J. L. Nayef Abu-Ghazaleh. Differential Deserialization for Optimized SOAP Performance. In SC05: High performance computing, networking, and storage conference, November 2005.

[8] M. L. Noga, S. Schott, and W. Lowe. Lazy xml processing. In DocEng '02: Proceedings of the 2002 ACM symposium on Document engineering, 2002.

[9] Y. Pan, W. Lu, Y. Zhang, and K. Chiu. A Static Load-Balancing Scheme for Parallel XML Parsing on Multicore CPUs. In 7th IEEE International Symposium on Cluster Computing and the Grid, Rio de Janeiro, Brazil, 2007.

[10] J. L. Sussman, E. E. Abola, N. O. Manning, and J. Prilusky. The protein data bank: Current status and future challenges, 1996.

[11] H. Sutter. The free lunch is over: A fundamental turn toward concurrency in software. Dr. Dobb's Journal, 30, 2005.

[12] T. Takase, H. Miyashita, T. Suzumura, and M. Tatsubori. An adaptive, fast, and safe xml parser based on byte sequences memorization. In WWW '05: Proceedings of the 14th international conference on World Wide Web, pages 692-701, New York, N.Y., USA, 2005. ACM Press.

[13] A. V. Aho, R. Sethi, and J. D. Ullman. Compilers: Principles, Techniques and Tools. Addison Wesley, 1986.

[14] R. van Engelen. Constructing finite state automata for high performance xml web services. In Proceedings of the International Symposium on Web Services (ISWS), 2004.

[15] J. van Lunteren, J. Bostian, B. Carey, T. Engbersen, and C. Larsson. Xml accelerator engine. In The First International Workshop on High Performance XML Processing, 2004.

[16] D. Veillard. Libxml2 project web page. [http://]xmlsoft.org/, 2004.

[17] W3C. Canonical XML. [http://]www.w3.org/TR/2001/RECxml-c14n-20010315, 2001.

[18] W3C. Extensible Markup Language (XML) 1.1 (Second Edition). [http://]www.w3.org/TR/2006/REC-xml11-20060816/, 2006.

The invention claimed is:

1. A method of preparsing a data object having a data structure comprising a hierarchy, comprising:
dividing the data object into a plurality of sequential chunks;
evaluating a respective chunk subsequent to an initial chunk based on a plurality of potentially valid initial states for the respective chunk;
generating, for a plurality of potentially valid initial states of the respective chunk, multiple skeletons, each skeleton representing a hierarchical arrangement of the data in the respective chunk and an end state of the respective chunk;
selecting a logically consistent skeleton for an actual initial state of the respective chunk; and
using the hierarchical arrangement of the data in the respective chunk and end state of the respective chunk to interpret a subsequent chunk of the data object, comprising using a set of remnants from state transitions of the respective chunk to resolve an initial state of the subsequent chunk of the data object.

2. A method for processing an input file or stream, comprising:
receiving a definition of an original finite state machine;
transforming the original finite state machine to a plurality of corresponding finite state machines, each corresponding finite state machine having an output equivalent to the original finite state machine subject to a different respective starting state;
receiving a data object subject to a plurality of possible starting states;
processing the data object with the plurality of corresponding finite state machines;
selecting an output of one corresponding finite state machines corresponding to a proper starting state for the data object; and
applying a set of remnants from state transitions of an earlier data object to resolve a later data object.

3. The method according to claim 2, wherein an output of the selected corresponding finite state machine comprises a state and a set of remnants representing unmatched results from state transitions.

4. The method according to claim 2, further comprising interpreting the output of the selected corresponding finite state machine dependent on the set of remnants, representing unmatched results from state transitions from antecedent data objects.

5. The method according to claim 2, wherein at least one of the plurality of corresponding finite state machines results in a dead state from which there is no valid transition.

6. An apparatus adapted to process an input file or stream, comprising:
an input adapted to receive at least a portion of a data object having a hierarchical structure parsable by a finite state machine, and having one of a finite number of possible starting states as an actual starting state;
a memory storing a definition of the finite state machine, transformed for each of the possible starting states;
at least one processor, having a plurality of processing resources available concurrently, adapted for:
processing the at least a portion of the data object with the transformed finite state machines to analyze the hierarchical structure;
determining a valid one of the possible starting states; and
an output port adapted to present at least the hierarchical structure associated with the analyzing by the transformed finite state machine associated with the valid one of the possible starting states, and a set of remnants representing unmatched state transitions based on the processing of the at least a portion of the data object.

7. The apparatus according to claim 6, wherein the processor is further adapted for interpreting at least the hierarchical structure dependent on the set of remnants.

8. The apparatus according to claim 6, wherein the processor is further adapted for determining one of the transformed finite state machines results in a dead state from which there is no valid transition, and thereafter truncating processing predicated on an analysis by that transformed finite state machine.

9. A nontransitory computer readable medium, storing therein instructions for controlling a programmable processor to perform a method comprising:
receiving a data object through a communication port having a parsable hierarchical structure, a non-initial portion of the data object having a proper one of a finite number of possible starting states defined by preceding portions of the data object;

processing the non-initial portion of the data object with a plurality of finite state machines, each respectively corresponding to a different respective one of the finite number of possible starting states; and selecting an output of one finite state machine corresponding to a proper one of the finite number of starting states for the non-initial portion of the data object, wherein a set of remnants from state transitions of an earlier portion of the data object are used to resolve the non-initial portion of the data object.

10. The computer readable medium according to claim 9, wherein the selected output is used to specify a proper starting state for a subsequent portion of the data object.

11. The computer readable medium according to claim 9, wherein the selected output and the set of remnants are used to analyze a subsequent non-initial portion of the data object.

12. The computer readable medium according to claim 9, wherein at least one of the plurality of finite state machines results in a dead state from which there is no valid transition, and wherein after determining that a respective finite state machine results in a dead state, processing of all portions of the data object predicated on the possible starting state associated with the respective finite state machine are terminated.

13. The computer readable medium according to claim 9, wherein the data object is part of a series of data objects, each respective portion of the data object having an end state corresponding to a begin state of a subsequent portion of the data object, and having the set of remnants from unmatched state transitions between the two, and the programmable processor is further controlled to reconstruct a hierarchical structure of a set of portions of the data object based at least on the processing and the remnants.

14. The method according to claim 1, wherein said using the hierarchical arrangement of the data in the respective chunk and end state of the respective chunk to interpret a subsequent chunk of the data object comprises using the selected logically consistent skeleton and the set of remnants to interpret a subsequent chunk of the data object.

15. The method according to claim 1, wherein:
evaluation of a plurality of respective chunks is commenced prior to availability of the end state of a respectively preceding chunk of the data object for each of the plurality of respective chunks;
at least one of the multiple skeletons for a respective chunk represents a finite state machine which results in a dead state from which there is no valid transition; and
after determining that a respective skeleton represents the finite state machine that results in a dead state, processing of all respectively subsequent chunks of the data object predicated on the respective skeleton that represents the finite state machine that results in the dead state are terminated.

16. The method according to claim 1, wherein each respective chunk of the data object has an end state corresponding to a begin state of a subsequent chunk of the data object, and having the set of remnants from unmatched state transitions between the respective chunk and the subsequent chunk, said using the hierarchical arrangement of the data in the chunk and end state of the chunk to interpret a subsequent chunk of the data object comprising reconstructing a hierarchical structure of the data object based at least logically consistent skeleton and the set of remnants.

* * * * *